Patented Aug. 28, 1945

2,383,653

UNITED STATES PATENT OFFICE 2,383,653

SILICIC ACID SOLS

Joseph S. Kirk, Cleveland, Ohio, assignor to E. I. du Pont de Nemours & Company, Wilmington, Del., a corporation of Delaware No Drawing. Application June 4, 1941,
Serial No. 396,564

7 Claims. (Cl. 252—309)

This invention relates to silicic acid sols and gels, to processes for their production, and to their use. The invention is more particularly directed to compositions of matter comprising silicic acid combined with an organic hydrogen bonding donor compound, and to the production and use of such compositions.

Silicic acid sols and gels are ordinarily prepared by the treatment of an aqueous silicate solution with a suitable acid. As a usual thing, sodium silicate is treated with sulfuric or hydrochloric acid. Sols and gels thus prepared contain salts as impurities and additionally contain an excess of water. While considerably more expensive, silicic acid sols and gels can be prepared by the hydrolysis of silicic acid esters such as ethyl silicate, or they may be prepared from silicon halides such as silicon chloride or silicon tetrachloride.

Silicic acid sols, however prepared, set rather quickly to a gel. The usefulness of such sols is accordingly limited since for many purposes they must be freshly prepared at the time of use. The conversion of the silicic acid sol to a gel is accompanied by changes in physical and chemical properties and difficulty is experienced in using such sols for any purpose in which these properties are at all critical.

Silicic acid sols are highly active chemically and this property makes them poorly suited to some uses. Silicic acid sols are hardly suitable as tanning agents, for instance, because of their rapid and astringent action upon skins.

It is an object of the present invention to provide novel compositions comprising silicic acid and to provide processes for their production. It is a further object of this invention to provide silicic acid sols and gels free from excess water and salt impurities and to provide processes for the separation of silicic acid sols and gels from excess water and salt impurities. It is a still further object of this invention to provide silicic acid sols of novel character and which set to a gel less rapidly than those customarily produced. It is a still further object to produce silicic acid sols and silicic acid gels of modified chemical and physical character. Still further objects will become apparent hereinafter.

The foregoing and other objects of this invention are attained by the inclusion in a silicic acid sol of an organic hydrogen bonding donor compound. More specifically it is preferred to use as a hydrogen bonding donor compound a water-soluble ether or amide.

By the inclusion of a hydrogen bonding donor compound in a silicic acid sol there are obtained silicic acid sols and gels of novel physical and chemical character. The sols together with certain hydrogen bonding agents may be separated from salt impurities and from water. The sols are of increased stability. The sols are more suitable for paper coating, for instance, by reason of the presence of the hydrogen bonding agent, and their improved chemical and physical characteristics similarly increase their suitability for many purposes.

Hydrogen bonding is a concept advanced in recent years to explain certain abnormalities in the chemical and physical behavior of mixtures of compounds one of which contains hydrogen attached to a strongly negative radical and the other an atom capable of donating a pair of electrons to form a directional or co-ordination bond. Since the bond is formed by the donation of an electron pair from one atom, the donor, to the other atom the bond is not of the type conceived as an ordinary valence bond but many of the properties of the mixture indicate that a type of chemical compound is formed. These mixtures, for instance, exhibit an abnormal vapor pressure lowering, that is abnormal deviation from Raoult's law. There is further observed abnormal heats of mixing and abnormal deviation in viscosity and freezing point lowering.

I have found that when silicic acid is mixed with an organic hydrogen bonding donor compound it exhibits characteristics unexplainable upon the basis of ordinary chemical reaction and unexpected from a consideration of the characteristics of the materials mixed. Apparently silicic acid has an acceptor hydrogen atom and forms some type of compound with a hydrogen bonding donor. Among the characteristics of these silicic acid-hydrogen bonding donor combinations is a decreased tendency to precipitate gelatin and an increase in the time required for the sol to be converted to the gel.

It will be understood that in advancing the theory of hydrogen bonding to explain the unexpected results of the present invention I do not intend to be limited or restricted by this theory. The theory may or may not be correct and for purposes of the present invention it is of importance largely because whatever the reason, the type of compounds known to be organic hydrogen bonding donors profoundly modify silicic acid sols and gels.

Silicic acid sols according to this invention are formed in aqueous solution and hydrogen bonding agents used should accordingly be water-soluble at least to the slight extent required to permit formation of a co-ordination complex with silicic acid. Preferably the donor compound should be quite water-soluble.

A hydrogen bonding donor should not contain groups which will react with silicic acid to give compounds or precipitates of the conventional sort when such reaction would interfere with the hydrogen bonding. It is further to be noted that while some hydrogen bonding agents produce water-insoluble complexes it is often preferred to use only those hydrogen bonding agents which do not lead to any type of precipitate.

The water-soluble organic hydrogen bonding donor compounds used according to this invention are preferably selected from the group consisting of ethers and amides. It is preferred that the amides be N-substituted and that the ethers have an oxygen or nitrogen atom in addition to that in the ether linkage. Preferred hydrogen bonding agents may be characterized by the description that they are nonalkaline, organic electron donor compounds containing at least one electro-negative atom selected from the group consisting of nitrogen and oxygen to which is attached not more than (X-2) hydrogen atoms, where X is the minimum normal valence of the electro-negative atom, the other valences of the electro-negative atom being satisfied by carbon atoms, and there being not more than one valence bond to any one carbon atom unless that carbon is also bonded to a nitrogen atom other than the first-mentioned electro-negative atom.

Ethers are among the most effective of hydrogen bonding agents for use with silicic acid according to the present invention. Donors of this class in addition to containing an ether group may advantageously contain an oxygen or nitrogen atom in addition to that in the ether linkage and may contain, say, an additional ether group, a hydroxy group, an amide group, or an ester group. The presence of these groups appears very beneficial. A number of such groups may be present and there may be used, for instance, poly-ethers which contain hydroxyl groups and ester groups.

As examples of ethers the following are listed:

Nonaethylene glycol
Dimethyl ether of tetraethylene glycol
Dimethyl ether of diethylene glycol
Hexaethylene glycol
Butyl ether of diethylene glycol
Ethyl ether of diethylene glycol acetate
Methyl ether of diethylene glycol acetate
Tetraethylene glycol
Monoethyl ether of diethylene glycol
Triethylene glycol
Monoethyl ether of ethylene glycol
Monomethyl ether of ethylene glycol
Diethylene glycol
N,N'-bis(beta-methoxyethyl) adipamide
N,N'-bis(methoxymethyl) urea
Polyethylene glycol adipate
Diethyl ether of diethylene glycol
Dioxane
Dioxolane
Diethyl ether of ethylene glycol
Dimethyl ether of ethylene glycol
Triethylene glycol dipropionate
Glycerol formal
Ethylene glycol acetal
Sorbitol triacetal
N,N-dimethylmethoxyacetamide
N-acetylmorpholine
N,N'-adipyldimorpholine
Dimorpholide urea
Polyethylene oxide Polyethers obtained by the polymerization or interaction of ethylene oxide, propylene oxide, and the like with other organic substances are useful in modifying silicic acid by reason of ether groups which they contain. The following are examples of such reaction products:

Monomethyl ether of ethylene glycol-ethylene oxide reaction product
Ethylene glycol-ethylene oxide reaction product
Glycerol-ethylene oxide reaction product
Ethanolformamide-ethylene oxide reaction product Amides are among the preferred hydrogen bonding donors for use with silicic acid according to this invention. Whereas oxygen is the donor atom in ethers the nitrogen of amides probably acts as the donor atom. Among the most effective compounds of this group are the N-substituted amides and the di-substituted compounds are preferred.

Examples of amides are listed below, ureas and other amides being listed separately:

*Ureas*

Tetramethylurea
Tetraethylurea
Urea
Thiourea
N,N'-diethyl-N,N'-diethanolurea

*Amides*

N,N,N',N'-tetramethyladipamide
N,N-dimethylacetamide
N,N,N',N'-tetramethylsuccinamide
N,N,N',N'-tetraethylsuccinamide
N,N-diethylacetamide
N,N,N',N'-tetraethyloxamide
N,N-diethylformamide
N,N-diethylpropionamide
N,N-dimethylformamide
N,N-diethylglycolamide
N-ethyl-N-ethanolformamide
N-ethyl-N-ethanolglycolamide
N-(2,3-dihydroxypropyl) methoxyacetamide
N-butyl-N-beta-hydroxyethyllacetamide
N-ethanolethanesulfonamide
N-isobutylacetamide
N,N'-diethanoloxamide
N,N'-diethanolsuccinamide
N-formylhexamethylenimine
Diethylcyanamide
Acetamide
Succinamide
Formamide Silicic acid sols containing a hydrogen bonding donor may be prepared according to any of the processes known to the art for the preparation of silica sols, it being necessary according to the present invention only to include in the sol a hydrogen bonding donor compound. In a typical process a sodium silicate solution is added with mixing to a solution of acid which contains a hydrogen bonding donor. The amounts of silicate and acid are so selected as to produce a silica sol.

It will be understood that any soluble silicate such as sodium potassium or ammonium silicate and any suitable acid such as sulfuric, sulfamic, hydrochloric, nitric, thionic, lactic, acetic and the like may be used. Acidulous salts may similarly be used and there may be employed, for instance, sodium bisulfate, monosodium phosphate, acid tartrates, zinc chloride, titanium sulfate, aluminum sulfate, and chromium sulfate. The amount of acid or acidic material will ordinarily be such as to result in a pH of about 1.0 to 5.0.

Silicic acid sols may be prepared in still other manners and they may be made, for instance, from silicic acid esters, partially hydrolzed esters of silicic acid, and silicon halides. Typical of such methods of preparation are the following:

*From methyl silicate.*—Method described by Grimaux, Compt. rend. 98, 105 (1884); 98, 1434 (1884).—According to my modification of this method, sols may be prepared by stirring methyl silicate with a sufficient quantity of water so that there are say 5 parts of $SiO_2$ per 100 parts of the mixture. The addition of sufficient acid to lower the pH to about 1 or 2 accelerates the rate of hydrolysis of the methyl silicate and increases the stability of the silicic acid in a low molecular weight state.

*From silicon tetrachloride.*—E. C. Williams, U. S. Patent 1,539,342.—Silicon tetrachloride is stirred into water with agitation and in such proportion as to give a solution of silicic acid which gels on standing. One method of carrying out this reaction would be to run silicon tetrachloride in a thin stream into a slightly acidified mixture of water and ice until, for example, the mixture contains 4 per cent by weight of $SiO_2$. The excess acidity is then neutralized with alkali such as 20 per cent NaOH solution with violent stirring as the alkali is added, until a pH of 1 or 2 is reached.

*From silicon sulfide.*—Fleury, U. S. Patent 61,931.—By stirring silicon sulfide with water, a solution of silicic acid can be obtained with the simultaneous evolution of hydrogen sulfide.

*By electro-osmosis of sodium silicate solution.*—Schwerein, U. S. Patent 1,132,394.—A dilute solution of sodium silicate is subjected to electro-osmosis, the silicic acid being obtained as a solution in the anode compartment.

*By the electrolysis of sodium silicate with a mercury cathode.*—N. L. Collins, U. S. Patent 1,562,940.—By electrolyzing a solution of sodium silicate in a cell fitted with a lead anode and mercury cathode, there is obtained a solution of silicic acid. By adding a small quantity of salt, such as sodium chloride, to the solution just before hydrolysis, the stability of the silicic acid would be increased by virtue of the small amount of hydrochloric acid thereby formed at the anode.

The silica sols obtained by procedures such as those described and others can be used in the form in which they are produced or they may if desired be separated from excess water and salt impurities. With hydrogen bonding agents such as dimethoxytetraethylene glycol and diethylacetamide it will be found satisfactory to add sodium sulfate to the solution to cause separation of the silica complex.

Silicic acid sols according to the present invention are preferably formed in the presence of a hydrogen bonding agent but if desired the hydrogen bonding agent may be added to a freshly-prepared sol. Silica gels of this invention form slowly by reason of the presence of the hydrogen bonding agent and the gels are of a different character than those produced in the absence of a hydrogen bonding agent. It will not be satisfactory to add a hydrogen bonding agent to a gel after the typical gel structure has been allowed to form.

The amount of hydrogen bonding agent to use in any particular instance depends to a considerable extent upon the magnitude of effect desired. Relatively small amounts may be used when only small effects are wanted but in general it will be found preferable to produce silicic acid sols and gels using molecular ratios of $SiO_2$ to hydrogen bonding agent of from about 1:4 to 1:1. Ratios as great as 1:0.1 have been used in some cases with advantage.

Silicic acid sols and gels containing hydrogen bonding donor compounds according to the present invention may be used for various of the purposes for which sodium silicate and silicic acid sols and gels have heretofore been used. Silicic acid sols prepared according to the present invention may be used with particular advantage in tanning.

In addition to their use for tanning skins the silicic acid sols of the present invention may advantageously be used for tanning any protein and thus may be used, for instance, for the tanning or precipitation of gelatin for preparation of photographic films and similar films using gelatin coatings. The silicic acid sols of the present invention may be found suitable for use in textile treatments and they may be used for treating wool as a dye substantive. They may be used for the treatment of cotton fibres, silk, rayon, or nylon for weighting, sizing, and stiffening.

The silicic acid sols of this invention may also find application in the treatment of paper and they may be used in the pulp to increase the wet strength and they may be used for filling and stiffening the paper product. In such use they may of course be supplemented by aluminum, calcium, or magnesium salts and by latex, paraffin, and other similar materials customarily used in the art. The sols may be used as rubber fillers being precipitated, for instance, with calcium chloride or magnesium chloride. In such uses it will probably be preferred to use the silica sol freed from water and salt impurities. The silica sols may similarly be use with plastics and resins as fillers or as coating agents and they may be used in combination with film-forming compositions to assist and modify them.

The silica sols of this invention may similarly find application in fireproofing and the like and they may advantageously be used with complex amine derivatives as fire retardants. They may be used in coating and paint compositions together with clay, pigments, or other paint ingredients in customary fashion. They are particularly adapted for use in paints containing protein because the film upon drying becomes insolubilized and the protein is tanned.

The silica sols of the present invention may be used for coating metals, particularly such metals as magnesium and aluminum. They may be used as emulsifying agents; they may be used for the treatment of glass fibres for a matting and as a dye substantive. They may be baked on glass to activate the surface and for coating. The silica sols may be used as adhesives and cements. They may be used as a binding agent for rock wool. For such uses they may advantageously be combined with other metals.

The silica gels prepared by gelling of the silica sols of this invention may be dried as a catalyst support and may be employed for other purposes for which silica gels are used in the art.

The practice of the invention may be better understood by reference to the following illustrative examples:

In order to prepare the composition of this invention, it is first necessary to prepare a silicic acid sol. A typical method of preparing such a sol is as follows:

Sodium silicate solution containing 3.26 parts of silica per part of $Na_2O$ by weight and having a specific gravity of 1.372 (42.5° Bé.) is diluted with water until the solution contains 9.8 per cent by weight of $SiO_2$. The silicic acid sol is made by adding about 494 parts of such a sodium silicate solution to 374 parts by weight of solution of sulfuric acid containing 7.39 parts of $H_2SO_4$ per 100 parts of solution by weight. The acid solution should be violently agitated and the silicate solution should be added in a thin stream to the violently agitated acid. The resulting solution of silicic acid should have a pH between 1.5 and 2.0, the exact proportion of sulfuric acid being adjusted so as to obtain this final pH; the resulting solution contains 60 grams of $SiO_2$ per liter or about 5.55 parts by weight of $SiO_2$ per 100 parts of the final aqueous solution.

The above solution of low molecular weight silicic acid continually ages on standing, the molecular weight of the silicic acid increasing due to polymerization to polysilicic acid. Extremely high molecular weights are produced after one or two days at room temperature (20 to 30° C.) so that the solution finally sets to a gel. When once gelled, the silica is no longer soluble in water, will no longer pass thru filter paper if more water is added and the solution stirred.

*Example 1*

To 5 parts by weight of silica sol prepared as described above, having a pH of 2.0 and having aged one hour after its preparation, was added 0.5 part by weight of diethylene glycol, having the formula, $HOC_2H_4OC_2H_4OH$. Upon adding 2 parts of a 1 per cent gelatin solution, having a pH of 2.5, no precipitate formed. (On adding 2 parts of the gelatin solution to 5 parts of the silica sol to which had been added no diethylene glycol, an immediate precipitate was observed.) This compatible mixture of gelatin and silicic acid may be applied to paper to give a size, which upon aging and drying becomes insoluble in water.

*Example 2*

To 1200 parts by weight of silicic acid sol prepared as above and aged for one hour, are added 100 parts by weight of "diethyl Carbitol," the diethyl ether of diethylene glycol, and 360 parts by weight of sodium chloride, with vigorous stirring. Upon centrifuging the solution, about 120 parts of a viscous liquid layer heavier than the rest of the fluid is collected and diluted with 350 parts by weight of methanol. Cotton broadcloth was padded in this solution and wrung out under such a pressure that it retained a weight of solution equal to the weight of dry cloth. The cloth was then partially air-dried and ironed. The resultant fabric had the appearance of being heavily starched, that is, it was very much stiffened. Upon analysis, the dried fabric was found to contain about 9 per cent $SiO_2$, of which only a minor portion was removed by laundering. Cellulose acetate fabric treated in this manner was found to have lost its property of acquiring a static charge when rubbed. Filter paper treated with this solution and dried is found to have a very much higher wet strength than the untreated paper.

*Example 3*

To 200 parts by weight of the silicic acid solution prepared as described above is added 30 parts of an ethylene oxide polymer, having the general formula $HOC_2H_4O(C_2H_2O)_x \cdot C_2H_4OH$, and an average molecular weight of about 4000 (commercially known as "Carbowax 4000") dissolved in an equal part of water. To the mixture is added 73 parts of sodium chloride and the mixture is then centrifuged. About 36 parts of a heavy translucent fluid are found to be separated as a separate liquid phase. This liquid phase contained over 90 per cent of all the silica in the mixture. This liquid was soluble in alcohol, partially soluble in acetone, soluble in isopropanol, glycerol, ethylene glycol and water, and contained about 28 per cent by weight of $SiO_2$. It was fluid after standing for three days at room temperature. Hide substance may be impregnated with a solution of this material in order to obtain a tanned effect. It may be applied to fabrics as a coating material.

*Example 4*

Instead of adding the ethylene oxide polymer directly to the freshly prepared silicic acid solution as in the preceding example, the latter may be permitted to age for at least a day but not for a period sufficiently long to permit it to set to a gel. During this period the molecular weight of silicic acid increases and upon addition of the ethylene oxide polymer, there is formed a precipitate rather than a liquid phase. This precipitate is a soft flocculent material and can be removed from the solution by centrifuging or by filtration. It is a white, opaque material which becomes hard upon aging; it is initially soluble in alcohol, but becomes insoluble upon aging. This material may be spread upon paper to form a coating or may be dissolved in alcohol and applied to paper or fabric.

*Example 5*

To 200 parts of the silicic acid solution prepared as described, was added 10 parts of nonaethylene glycol, a polyether compound having the formula $HO(C_2H_4O)_9H$. In the presence of nonaethylene glycol, the solution no longer gave a precipitate when 1 cc. of 1 per cent gelatin solution was added to 5 cc. of the mixture in a test tube, in contrast to the unmodified silicic acid, which gave an immediate precipitate. On permitting the solution containing the nonaethylene glycol to stand for 24 hours, there was slowly formed a mass of soft precipitate. Upon examination under the microscope, the precitate appeared to consist of very small, fairly uniform spheres about 1 to 5 microns in diameter. It was found that this precipitate could be easily filtered off and washed, the nonaethylene glycol being slowly washed out of the precipitate, leaving extremely finely divided particles of silica gel in the original spherical shape. This silica, when dried, was a very fluffy, impalpable powder.

The physical condition of this silica was in marked contrast to the gel obtained by aging an unmodified silicic acid solution. The latter solution set to a clear gel, which, upon being broken up and washed with water, consisted of large irregular particles of hard silica gel, having a glassy appearance. Under no circumstances was it possible to obtain finely divided silica which spontaneously fell apart into a soft smooth powder upon drying, by aging an unmodified solution of silicic acid. Once this hard silica gel had formed, the addition of nonaethylene glycol did not modify its properties.

This silica may be used as a filler in paint, plastics, and especially in rubber.

Example 6

To 30 parts of the solution of silicic acid solution containing about 1.8 parts of SiO₂, prepared and described as above, was added 5 parts of N,N'-bis(methoxymethyl) uron, having the formula:

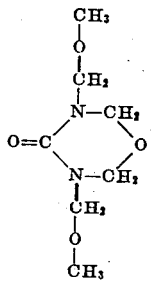

On permitting the mixture to stand for over 24 hours, a precipitate slowly formed which nearly filled the solution. It was soft and easily broken up; it was filtered off, washed thoroughly and dried. It consisted of microscopic spheres massed together in clumps. About 3.1 parts by weight of this product was obtained. This product appears to be an interpolymer of silicic acid and the organic hydrogen bonding agent. This particular agent is known to spontaneously undergo polymerization in such an acid solution.

Example 7

To 1000 parts of silicic acid solution prepared from sodium silicate and acid as described above, are added 80 parts of the dimethyl ether of tetraethylene glycol and 300 parts of sodium chloride with vigorous stirring. Upon centrifuging the solution, about 70 parts of a heavy viscous liquid layer collects at the bottom of the vessel, and this lower liquid is mechanically separated from the upper aqueous phase and diluted with 300 parts of ethanol (95% strength). A quantity of this ethanol solution of silicic acid complex was added to a 10 per cent solution of polyvinyl alcohol so that about 20 parts by weight of silica are present in the mixture per 100 parts of dry polyvinyl alcohol. The mixture is then spread on a glass plate to dry; the resulting film is found to be considerably harder and stronger after immersion in warm water than polyvinyl alcohol films not containing silica.

Methyl cellulose may also be rendered less soluble in water by incorporating into methyl cellulose films the proper amount of silicic acid. Since polysilicic acid forms a precipitate with methyl cellulose in aqueous solution, it is advantageous to incorporate silicic acid dissolved in alcohol into methyl cellulose also dissolved in a water-alcohol mixture. Aside from the fact that an alcoholic medium is used as solvent, the preparation of silica-containing methyl cellulose films may be carried out in a manner very similar to that described for polyvinyl alcohol films.

Example 8

To 800 parts by weight of silicic acid solution prepared as described above from sodium silicate and sulfuric acid, and, having permitted the solution to age for 2 hours at about 25° C., 60 parts of hexaethylene glycol HO(C₂H₄)₆OH 240 parts of sodium chloride was added with stirring. The mixture was centrifuged and 36 parts of a heavy viscous layer was recovered and diluted with about 100 parts of alcohol. This alcoholic solution contained approximately 13 per cent by weight of SiO₂ in the form of low molecular weight silicic acid.

A solution of zein (a corn protein) was made up in 90 per cent alcohol so that the solution contained about 9 per cent by weight of the protein.

A mixture was now made of 20 parts of the alcoholic zein solution, 3 parts of the alcoholic solution of silicic acid, and ¼ part of tributyl phosphate as plasticizer. This mixture was perfectly clear. It was spread in a thin film on glass and dried. The dried film did not become sticky upon immersion in water at 75° C. as did the zein films similarly prepared with the omission of the silicic acid. The silicic acid apparently had a "tanning" effect on the protein, rendering the film less sensitive to water.

Example 9

To 80 parts of silicic acid solution prepared as described above, were added 16 parts of N-isobutylacetamide and 24 parts of sodium chloride. The mixture was stirred for about 5 minutes and centrifuged. An upper liquid layer formed containing 75 per cent of all the silica in the mixture and most of the isobutylacetamide. The properties of this liquid complex were as follows:

Upon shaking the complex with benzene or other hydrocarbon solvents, isobutylacetamide was extracted leaving a viscous, unpolymerized silicic acid which rapidly turned to a gel. The complex was completely soluble in diethyl Carbitol, in excess isobutylacetamide, in water, alcohol, glycerol, ethylene glycol, and most other solvents which are completely miscible with water. Upon mixing 5 parts of the liquid complex with 2 parts of water and 8 parts of benzene, two layers were formed; about 5 parts of lower layer containing water and silicic acid and about 10 parts of upper layer containing benzene and most of the isobutylacetamide were formed. The uses of the isobutylacetamide silicic acid complex are the same as those indicated for the diethyl Carbitol complex and the other liquid products described in the foregoing examples.

Example 10

To 100 parts of silicic acid solution prepared as described above, were added 10 parts of Carbitol (monoethylether of diethylene glycol) and 30 parts of sodium chloride. Upon centrifuging this solution, no separate phase containing silica was observed to form. Upon adding 20 parts of tertiary butyl alcohol and stirring and again centrifuging, about 22 parts of a separate liquid layer was formed above the aqueous phase. This liquid layer consisted of butyl alcohol, Carbitol and silicic acid; it contained 66 per cent of all the silicic acid in the mixture.

Example 11

To 100 parts of silicic acid solution prepared as described above were added 30 parts of sodium chloride and 10 parts of butyl Carbitol (monobutyl ether of diethylene glycol). Upon centrifuging the mixture, 12.5 parts of a heavy liquid formed at the bottom of the container. This rather viscous heavy liquid contained 81 per cent of the silica in the original solution. These liquid complexes containing unpolymerized silicic acid in a highly concentrated form are very much more stable than an aqueous solution of silicic acid in the same concentration. This technique, therefore, makes it feasible to recover silicic acid from an aqueous solution in a highly concentrated state for use in many of the applications herein described.

Example 12

To 500 parts of a silicic acid solution, prepared as described above and aged for about 2 hours, were added 45 parts of tetraethylurea and 155 parts of sodium chloride. The mixture was stirred for 5 minutes and then centrifuged. A layer lighter than the aqueous phase formed and collected at the upper part of the solution; 43 parts of this liquid layer was recovered to which was added 12.5 parts of 95 per cent alcohol. This resulting solution was analyzed and found to contain 21.4 per cent $SiO_2$ by weight. The liquid complex was soluble in alcohol and in excess tertaethylurea. This complex may be used in the various applications mentioned above.

While I have shown certain illustrative processes, compositions and uses in the foregoing it will be understood that one skilled in the art may readily prepare silicic acid containing a hydrogen bonding donor in various ways and may use it for a wide variety of purposes without departing from the spirit of this invention.

This application is a continuation-in-part of my application Serial Number 355,605, filed September 6, 1940.

Reference is made to applicant's copending application No. 355,606, filed September 6, 1940, which issued March 17, 1942, as Patent No. 2,276,314.

I claim:

1. A composition of matter comprising a silicic acid sol and a water-soluble ether, wherein the carbons attached to the same ether oxygen are not directly attached to each other, the molecular ratio of $SiO_2$ to said ether being from about 1:4 to 1:0.1.

2. A composition of matter comprising a silicic acid sol and a water-soluble ether which in addition to the ether group contains a second ether group, the molecular ratio of $SiO_2$ to said ether being from about 1:4 to 1:1.

3. In a process for the modification of silicic acid the step comprising modifying a silicic acid sol by admixing therewith a water-soluble organic hydrogen bonding donor compound selected from the group consisting of amides and ethers, said ethers having an atom selected from the group consisting of oxygen and nitrogen, in addition to that in the ether linkage, the molecular ratio of $SiO_2$ to said hydrogen bonding donor being about 1:1 to 1:0.1.

4. In a process for the modification of silicic acid the step comprising forming a silicic acid sol in the presence of a water-soluble organic hydrogen bonding donor compound selected from the group consisting of amides and ethers, said ethers having an atom selected from the group consisting of oxygen and nitrogen, in addition to that in the ether linkage the molecular ratio of $SiO_2$ to said hydrogen bonding donor being from about 1:4 to 1:0.1.

5. A composition of matter comprising a silicic acid sol and a water-soluble ether which in addition to the ether group contains a hydroxy group, the molecular ratio of $SiO_2$ to said ether being from about 1:4 to 1:1.

6. A composition of matter comprising a silicic acid sol and a water-soluble ether which in addition to the ether groups contains an amide group, the molecular ratio of $SiO_2$ to said ether being from about 1:4 to 1:1.

7. A silicic acid sol comprising silicic acid combined with a water-soluble organic hydrogen bonding donor compound selected from the group consisting of amides and ethers, said ethers having an atom selected from the group consisting of oxygen and nitrogen, in addition to that in the ether linkage, the molecular ratio of $SiO_2$ to said hydrogen bonding donor being from about 1:1 to 1:0.1.

JOSEPH S. KIRK.